(No Model.)
F. A. HILL.
APPLE PARER, CORER, AND DOFFER.
No. 268,487. Patented Dec. 5, 1882.
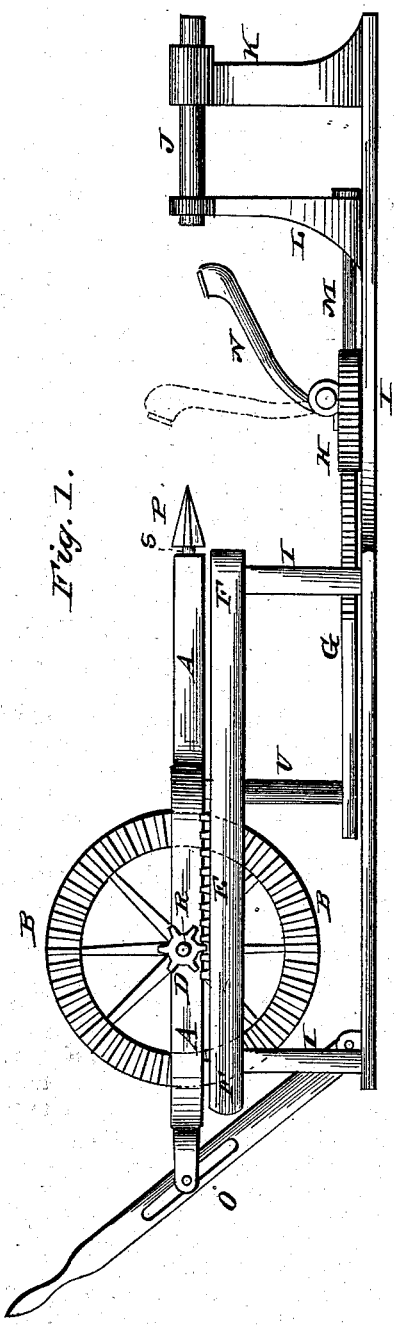
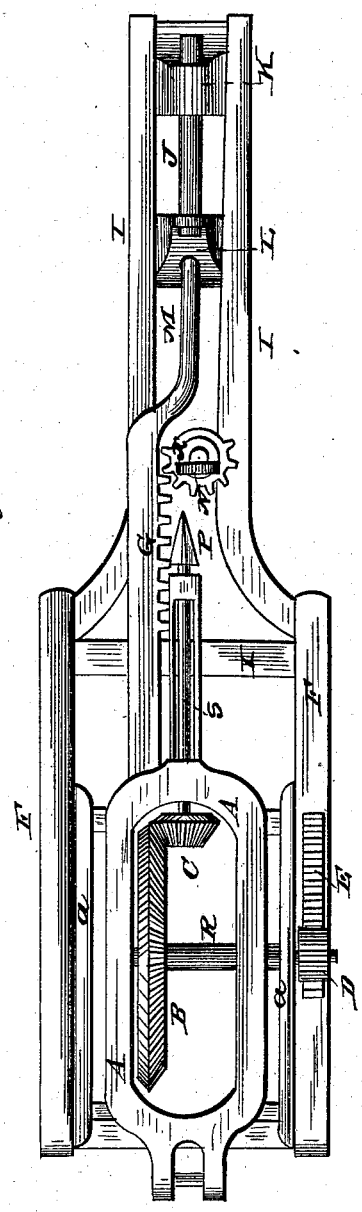
WITNESSES:
Fred. G. Dieterich
P. C. Dieterich
INVENTOR.
F A Hill
J. B. Diver ATTORNEYS

UNITED STATES PATENT OFFICE.

FRANCIS A. HILL, OF ONTARIO, NEW YORK.

APPLE PARER, CORER, AND DOFFER.

SPECIFICATION forming part of Letters Patent No. 268,487, dated December 5, 1882.

Application filed May 13, 1882. (No model.)

*To all whom it may concern:*

Be it known that I, FRANCIS A. HILL, of the town of Ontario, in the county of Wayne and State of New York, have invented certain new and useful Improvements in Combined Apple Paring and Coring Machines, of which the following is a specification.

Figure 1 of the drawings is a side elevation. Fig. 2 is a plan.

Similar letters represent the same parts in each figure.

The object of this invention is to construct an apple parer and corer so arranged that the apples will be pared and cored by one motion as the operating-lever is moved forward in a straight line.

This invention consists in the combination and arrangement of parts, as hereinafter described, and then specifically pointed out in the claims.

In the accompanying drawings, A represents the carriage, with its bearings *a a* resting upon and sliding in parallel ways F F, to which are attached the shaft R, spindle S, bevel-wheel B, bevel-pinion C, spur-pinion D, spindle-head P, and arm or part U, connecting with rack-bar G, which gears into the toothed portion of the spur-pinion H on the turning and returning table X, to which table is attached the paring-knife N. The movement of the carriage A actuates the rack-bar G, through the connection U.

J represents a coring-tube; K, its standard or support. L represents the doffer; M, the rod which connects the rack-bar G with the doffer L, by which the doffer is moved backward and forward.

E is a rack-bar attached to one of the guide-ways F, into which the spur-pinion D meshes or gears as the carriage is moved forward toward the coring-tube J. This coring-tube is firmly fixed in the post or support K, and in a direct line with the spindle S, so that when the carriage is moved forward sufficient the spindle-head P passes inside of the coring-tube J.

L is a sliding bar, one end of which has a round opening or hole of sufficient size to allow it to slide over the coring-tube J.

P is a spindle-head, formed of two or more thin plates or edges set at right angles to each other, so as to form a four-winged arrow-head, spindle, or point, upon which to place the apple to be operated upon. The object of constructing it in this form here represented is to prevent the possibility of its ever catching upon the edges of the coring-tube J.

I represents the bed-plate, upon which the machine is built.

O is a lever by which the carriage A may be moved, or it may be done by the direct force or pressure of the hand applied direct to the carriage A, without the lever. Again, the machine may be operated by power by attaching a connecting-rod from a crank or eccentric to the carriage where the lever O is now attached.

The pinion D may be rigidly attached to the shaft R, or it may be connected by a ratchet, so as to revolve around the shaft without revolving the gear while the carriage is being drawn back after paring and coring the apple.

To operate this machine, place the apple upon the spindle-head P, then move the carriage (either by hand or other power) toward the corer J. The pinion D catches into the rack E and causes the shaft R and the bevel-wheel B to revolve, and that, gearing into the pinion C, revolves the spindle and the apple. As the carriage moves forward the knife N is released and springs up against the apple, paring the forward end of it. As the carriage is still moved forward the rack-bar G is also moved, and, catching into the pinion H, the turn-table is revolved, which revolves the knife N, so as to pare the apple all around, which being accomplished, the pinion D runs off from the rack E, and the rotary motion of the machinery ceases. The carriage being still moved forward, the apple is forced upon the coring-tube J and cored, the point P passing inside the tube J. Thus the apple being pared and cored, the carriage is drawn back, and with it the doffer L, knocking the apple off the tube, where it was left by the spindle P. The core, being left inside the tube, is by the next apple forced through the tube and out at the opposite end. The machine is ready to receive another apple.

Having thus described my invention, I claim as new and desire to secure by Letters Patent—

1. In an apple parer and corer, the frame I, carrying the guides F and rack E, the reciprocating carriage A, carrying the shafts R and S, with bevel-gears B and C and spur-pinion D, and the rack-bar G, connected with carriage A and provided with means for imparting rotations to the paring-knife N, and also reciprocating the doffer L upon the corer J, mounted upon standard K, all the parts being combined and arranged for joint operation in the manner shown and described.

2. In an apple parer and corer, the combination of the doffer L with the carriage A, the arm U, the rack-bar G, the rod M, and the coring-tube J, substantially as herein shown and described, whereby the apple is knocked off the coring-tube, as set forth.

FRANCIS A. HILL.

Witnesses:
IRA J. HILL,
C. B. PATTERSON.